(12) United States Patent
Fujita

(10) Patent No.: US 7,969,471 B2
(45) Date of Patent: Jun. 28, 2011

(54) CONTROL APPARATUS AND CONTROL METHOD

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 11/007,404

(22) Filed: Dec. 8, 2004

(65) Prior Publication Data
US 2005/0128301 A1    Jun. 16, 2005

(30) Foreign Application Priority Data

Dec. 15, 2003 (JP) ................................. 2003-417002

(51) Int. Cl.
H04N 5/232 (2006.01)

(52) U.S. Cl. ............... 348/211.1; 348/211.3; 348/211.4; 348/207.1; 348/207.11

(58) Field of Classification Search ............... 348/211.1, 348/211.3, 211.4
See application file for complete search history.

(56) References Cited

U.S. PATENT DOCUMENTS

| | | | |
|---|---|---|---|
| 5,486,852 A * | 1/1996 | Arai | 348/211.2 |
| 6,122,005 A * | 9/2000 | Sasaki et al. | 348/211.3 |
| 6,628,325 B1 * | 9/2003 | Steinberg et al. | 348/211.1 |
| 6,819,355 B1 * | 11/2004 | Niikawa | 348/207.11 |
| 6,930,709 B1 * | 8/2005 | Creamer et al. | 348/211.3 |
| 2002/0099878 A1 * | 7/2002 | Henrie et al. | 710/14 |
| 2004/0109062 A1 | 6/2004 | Yamaya | |

FOREIGN PATENT DOCUMENTS

| | | | |
|---|---|---|---|
| JP | 2002-369106 A | 12/2002 |
| TW | 459196 B | 10/2001 |

* cited by examiner

*Primary Examiner* — Sinh Tran
*Assistant Examiner* — Paul Berardesca
(74) *Attorney, Agent, or Firm* — Canon USA Inc. IP Division

(57) ABSTRACT

A control apparatus receives a third command from a remote control apparatus. The control apparatus determines which of the first interface unit and the second interface unit is used to connect an image capture apparatus and the control apparatus, if a mode of the image capture apparatus is not the same as a mode designated by the third command. If the first interface unit is used to connect the image capture apparatus and the control apparatus is determined, the third command is converted into a first command for changing the mode of the image capture apparatus to the mode designated by the third command. If the second interface unit is used to connect the image capture apparatus and the control apparatus is determined, the third command is converted into a second command for changing the mode of to the image capture apparatus to the mode designated by the third command.

21 Claims, 4 Drawing Sheets

FIG.5

| bmRequest Type | bRequest | wValue | wIndex | wLength | Data |
|---|---|---|---|---|---|
| 00100001 | SET_CUR<br>SET_MIN<br>SET_MAX<br>SET_RES | CS | Selector Unit ID and Interface | Length of parameter block | Parameter block |

CONTROL APPARATUS AND CONTROL METHOD

BACKGROUND OF THE INVENTION

1. Field of the Invention

The present invention relates to a technique for externally controlling an image capture apparatus, such as a digital video camera, via a digital interface.

2. Description of the Related Art

Communication between a digital video camera (hereinafter referred to as a "DVCR") and a personal computer (hereinafter referred to as a "PC") can be established via a digital interface. If the digital interface is compliant with IEEE 1394 (see IEEE Std 1394-1995, IEEE Standard for a High Performance Serial Bus, Institute of Electrical and Electronics Engineers, Inc.; and IEEE Std 1394a-2000, IEEE Standard for a High Performance Serial Bus—Amendment 1), communication is performed on the basis of a command set defined by AV/C Digital Interface Command Set General Specification Version 4.1 (Nov. 19, 2001), or the like. If the digital interface is compliant with USB (see Universal Serial Bus Specification Revision 2.0, Apr. 27, 2000), communication is performed on the basis of a command set defined by Universal Serial Bus Device Class Definition For Video Devices.

The DVCR typically has two transmission modes, camera mode and VTR mode. In the camera mode, video data captured by the DVCR is transmitted in real time to a remote PC via a network. In the VTR mode, video data already captured and recorded on a magnetic tape or memory card loaded in the DVCR is transmitted to a remote PC via a network.

Switching between the camera mode and the VTR mode can be performed by a user operating a mechanical switch provided on the DVCR. However, the DVCR does not allow such switching to be performed in response to a control command transmitted from the PC.

More specifically, the user cannot control switching of the transmission modes of the DVCR by operating the PC. Thus, the user needs to directly operate the mechanical switch of the DVCR for performing such switching. For example, the user may conduct video telephone session by causing the DVCR to capture a video image of the user seated before the PC and to transmit the captured video data in the camera mode. If, during this video telephone session, the user wishes to change the DVCR to the VTR mode to transmit video data of the user's child previously captured and recorded on a magnetic tape, the user must move to the location of the DVCR to operate the mechanical switch thereof. This results in an inconvenience to the user.

Meanwhile, there are user requests for a DVCR having a plurality of types of digital interfaces to enhance convenience.

SUMMARY OF THE INVENTION

An aspect of the present invention is to overcome the above-described drawbacks.

Another aspect of the present invention is to enable an image capture apparatus, e.g., digital video camera or the like, having a plurality of digital interfaces to be externally controlled via each of the plurality of digital interfaces, thereby enhancing the convenience of the image capture apparatus.

In another aspect of the present invention, a control apparatus for controlling an image capture apparatus having first and second digital interfaces comprises a determination unit configured to determine which of the first and second digital interfaces is used to connect the image capture apparatus and the control apparatus, and a transmission unit configured to transmit to the image capture apparatus one of a first or a second command for changing a function of the image capture apparatus. If the determination unit determines that the first digital interface is used to connect the image capture apparatus and the control apparatus, the transmission unit transmits the first command to the image capture apparatus. If the determination unit determines that the second digital interface is used to connect the image capture apparatus and the control apparatus, the transmission unit transmits the second command to the image capture apparatus.

In yet another aspect of the present invention, a method for controlling an image capture apparatus having first and second digital interfaces comprises the steps of determining which of the first and second digital interfaces is used to connect the image capture apparatus and a control apparatus, and transmitting from the control apparatus to the image capture apparatus one of a first or a second command for changing a function of the image capture apparatus. The transmitting step comprises, if it is determined that the first digital interface is used to connect the image capture apparatus and the control apparatus, transmitting the first command to the image capture apparatus, and, if it is determined that the second digital interface is used to connect the image capture apparatus and the control apparatus, transmitting the second command to the image capture apparatus.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram showing a format of a mode change command (Set Selector Unit Control command) that is compliant with USB.

DETAILED DESCRIPTION OF THE EMBODIMENTS

Embodiments of the invention will be described in detail below with reference to the drawings.

Figure 1:
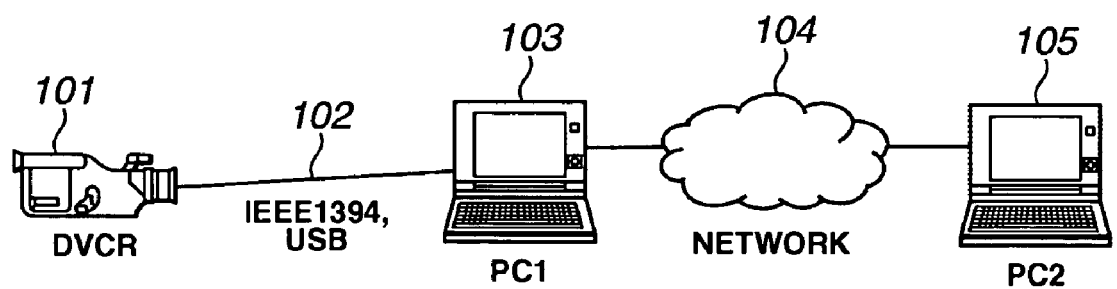
FIG. 1 is a diagram showing the configuration of a communication system according to an exemplary embodiment of the invention.

FIG. 1 is a diagram showing the configuration of a communication system according to an exemplary embodiment of the present invention.

In FIG. 1, a DVCR 101 is an image capture apparatus having a plurality of types of digital interfaces. In the present embodiment, the DVCR 101 has an IEEE 1394 interface and a USB interface. The IEEE 1394 interface is a digital interface that is compliant with IEEE 1394 (see IEEE Std 1394-1995, IEEE Standard for a High Performance Serial Bus, Institute of Electrical and Electronics Engineers, Inc.; and IEEE Std 1394a-2000, IEEE Standard for a High Performance Serial Bus—Amendment 1). The USB interface is a digital interface that is compliant with USB (see Universal Serial Bus Specification Revision 2.0, Apr. 27, 2000). The DVCR 101 is capable of being connected to a local PC 103 via a serial bus 102 that is compliant with IEEE 1394 or USB. The local PC 103 is connected to another remote PC 105 via a network 104, such as the Internet.

The DVCR 101 and the local PC 103 can transmit and receive video data, etc., according to a command defined by IEEE 1394 or USB. In this case, a command to the DVCR 101 is transmitted from an application program being executed on the local PC 103, so that the local PC 103 can control the DVCR 101. In addition, the local PC 103 can forward to the DVCR 101 a command that has been received from the remote PC 105 via the network 104.

Figure 2:
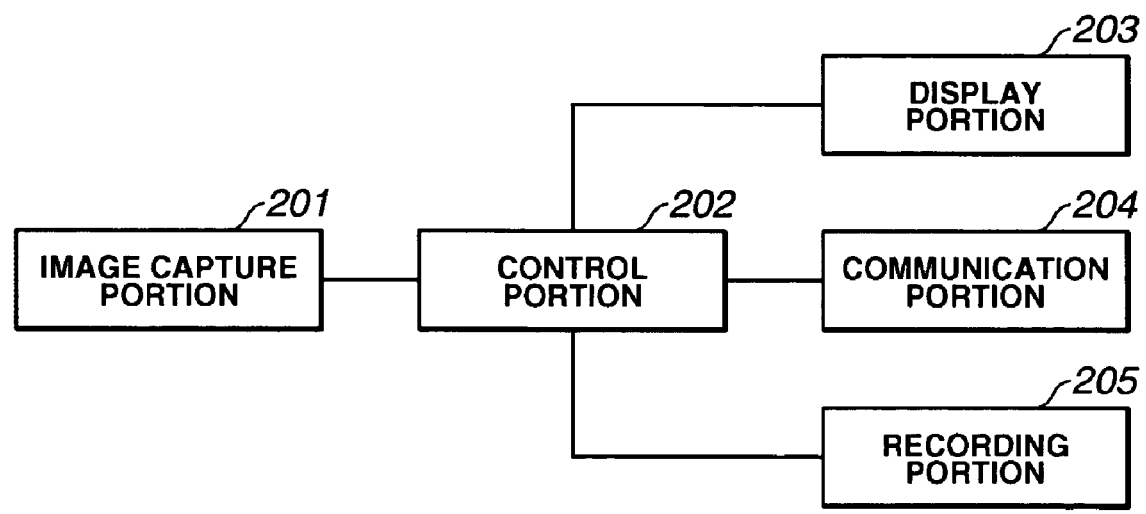
FIG. 2 is a block diagram showing the outline structure of a DVCR according to the embodiment.

FIG. 2 is a block diagram showing the outline structure of the DVCR 101. Referring to FIG. 2, the DVCR 101 includes an image capture portion 201, a control portion 202, a display portion 203, a communication portion 204 and a recording portion 205. The image capture portion 201 includes an image sensor (not shown), such as a CCD (charge-coupled device) sensor, for capturing object images to generate video data. The control portion 202 controls the operation of the entire DVCR 101. The display portion 203 displays video images and a variety of information indicative of modes, etc., of the DVCR 101. The communication portion 204 has an IEEE 1394 interface and a USB interface. The recording portion 205 records video data supplied from the image capture portion 201 on a recording medium, such as a magnetic tape or memory card.

The DVCR 101 has two communication modes, camera mode and VTR mode. In the camera mode, video data generated by the image capture portion 201 is supplied to the control portion 202, and the control portion 202 sends the video data in real time to the display portion 203, the communication portion 204 and the recording portion 205. In the VTR mode, video data already recorded in the recording portion 205 is read out and supplied to the control portion 202, and the control portion 202 sends the video data to the display portion 203 and the communication portion 204. In addition to the camera mode and the VTR mode, the DVCR 101 has a modeless mode. In the modeless mode, the camera mode and the VTR mode can be freely switched over on the basis of a command received from a control apparatus, e.g., the local PC 103 or the remote PC 105, via the communication portion 204. Switching of the camera, VTR, and modeless modes is performed by a user operating a hardware switch (not shown) provided on the DVCR 101.

Figure 3:
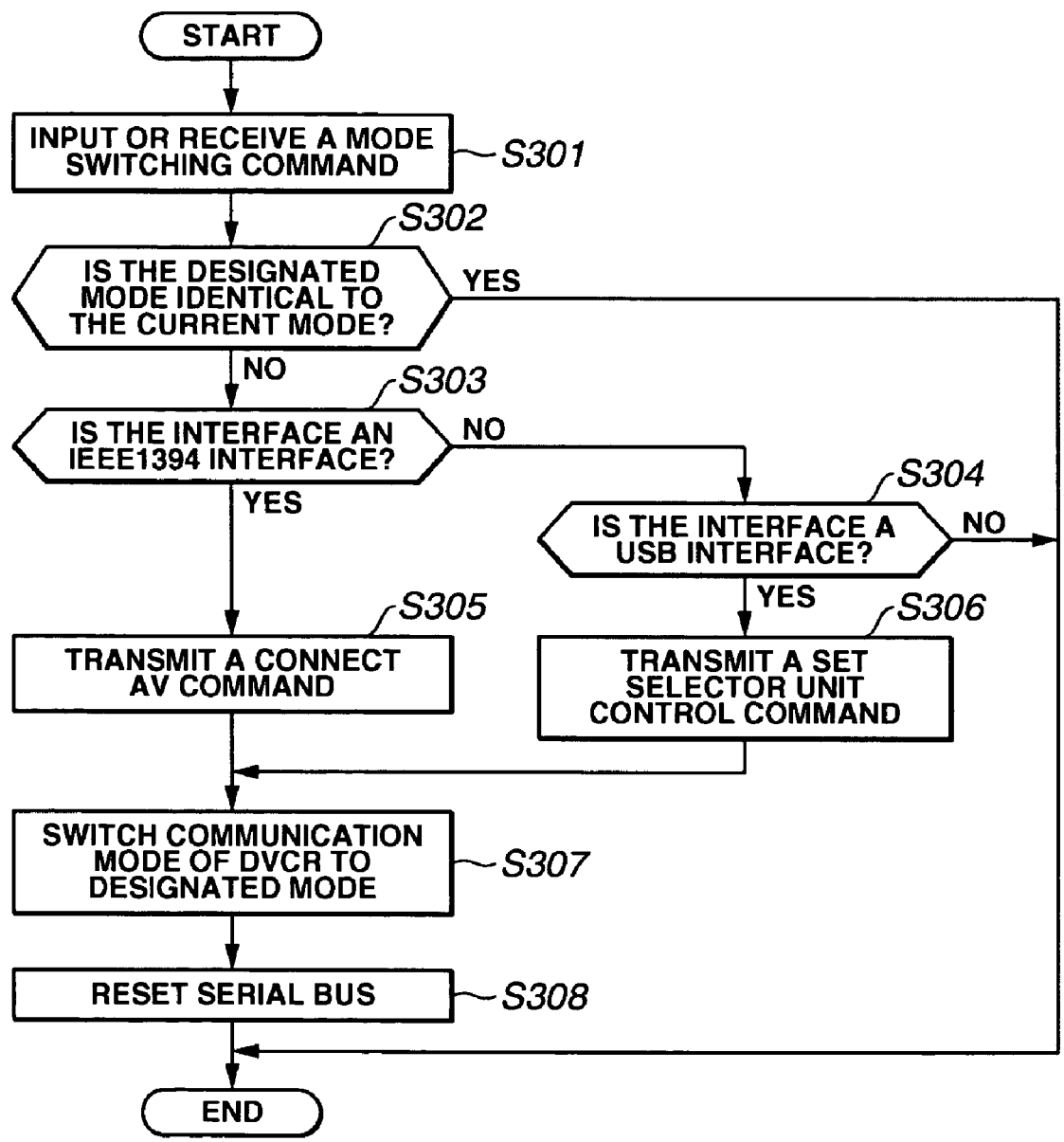
FIG. 3 is a flow chart illustrating a communication mode switching process based on a command from a control apparatus.

FIG. 3 is a flow chart illustrating a communication mode switching process based on a command from the control apparatus. The communication mode switching process is performed only when the DVCR 101 is set in the modeless mode. In addition, the processes at steps S301 to S306 are performed by an application program running on the local PC 103.

Referring to FIG. 3, at step S301, a mode switching command for the DVCR 101 is inputted to an application program being executed on the local PC 103, or the local PC 103 receives a mode switching command for the DVCR 101 from the remote PC 105 via the network 104. Then, at step S302, the local PC 103 checks the current communication mode of the DVCR 101 to determine if the current communication mode is identical to the mode designated by the input or received mode switching command. If the current communication mode is identical to the designated mode, the local PC 103 brings the communication mode switching process to an end.

Figure 4:
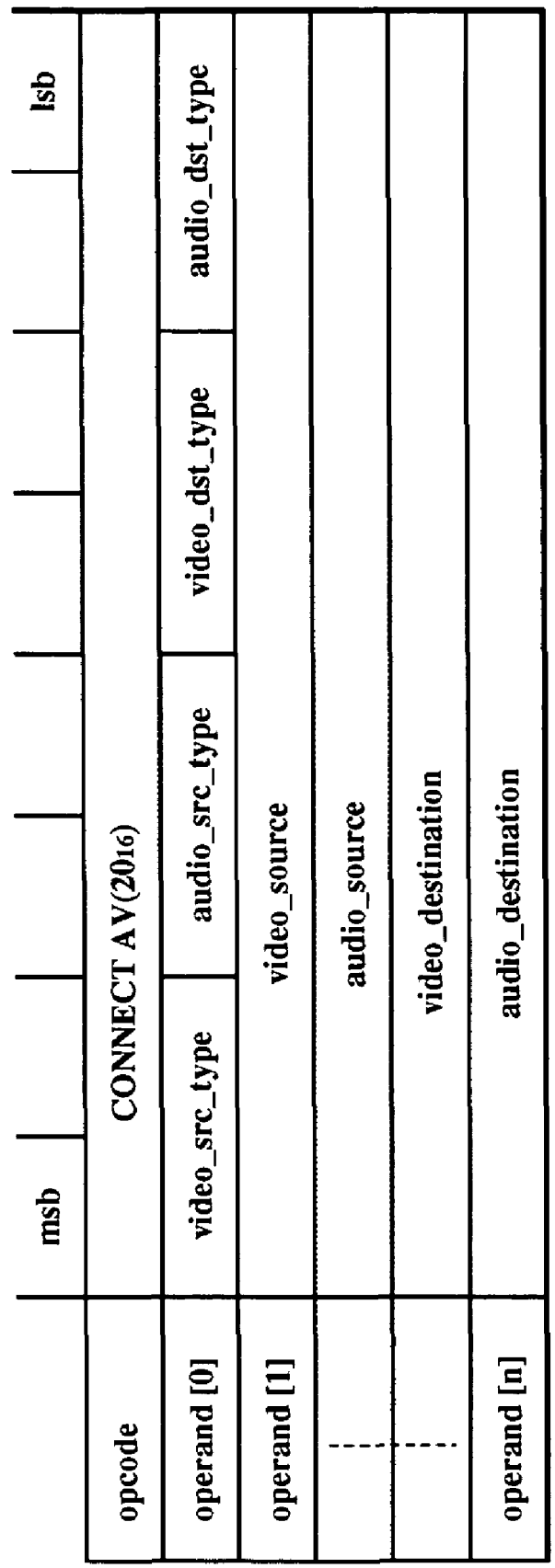
FIG. 4 is a diagram showing a format of a mode change command (CONNECT AV command) that is compliant with IEEE 1394.

If it is determined at step S302 that the current communication mode of the DVCR 101 is not identical to the mode designated by the input or received mode switching command the local PC 103 proceeds to step S303. At step S303, the local PC 103 determines if the digital interface used for communication between the local PC 103 and the DVCR 101 is an IEEE 1394 interface. If the digital interface used is the IEEE 1394 interface, the local PC 103 proceeds to step S305. At step S305, the local PC 103 converts the input or received mode switching command into a mode change command for the IEEE 1394 interface, e.g., a CONNECT AV command as shown in FIG. 4, and transmits the mode change command to the DVCR 101.

If it is determined at step S303 that the digital interface used is not the IEEE 1394 interface, the local PC 103 proceeds to step S304. At step S304, the local PC 103 determines if the digital interface used for communication between the local PC 103 and the DVCR 101 is a USB interface. If the digital interface used is the USB interface, the local PC 103 proceeds to step S306. At step S306, the local PC 103 converts the input or received mode switching command into a mode change command for the USB interface, e.g., a Set Selector Unit Control command as shown in FIG. 5, and transmits the mode change command to the DVCR 101. If, at step S304, the local PC 103 determines that the digital interface used for communication between the local PC 103 and the DVCR 101 is not a USB interface, then the local PC 103 brings the communication mode switching process to an end.

Determination of whether the digital interface used for communication between the local PC 103 and the DVCR 101 is an IEEE 1394 interface or a USB interface can be performed by detecting the presence or absence of a bias voltage to be applied to these interfaces. In addition to this method, any other method that would allow practice of the present invention is applicable.

Returning to FIG. 3, at step S307, the control portion 202 of the DVCR 101, which is set in the modeless mode, switches the current communication mode to the mode (camera mode or VTR mode) designated by the CONNECT AV command or the Set Selector Unit Control command received at the communication portion 204. Then, at step S308, the control portion 202 of the DVCR 101 resets the connection between the local PC 103 and the DVCR 101 by dropping a bias voltage which the digital interface applies to the serial bus 102 to connect with the local PC 103 and then applying the bias voltage again. Then, the communication mode switching process comes to an end.

As described above, the DVCR 101 has a dedicated mode (modeless mode) for switching communication modes (camera mode and VTR mode). Accordingly, it is possible to dynamically switch the communication modes of the DVCR 101 on the basis of a command from the local PC 103 or the remote PC 105 so that the convenience of the DVCR 101 can be enhanced. In this case, the input or received mode switching command is converted by an application program on the local PC 103 into a mode change command compliant with the format of the digital interface with the DVCR 101. The mode change command is then transmitted to the DVCR 101. Accordingly, even if the DVCR 101 has a plurality of types of digital interfaces, it is possible to switch the communication modes of the DVCR 101 in accordance with control from the local PC 103 or the remote PC 105 so that the convenience of the DVCR 101 can also be enhanced in this regard.

It should be noted that the present invention is not limited to the above-described embodiment. For example, the present invention can be applied to cases where the digital interface is compliant with a standard other than IEEE 1394 and USB, such as Ethernet®, IEEE 802.11a, IEEE 802.11b or IEEE 802.11g.

Furthermore, the present invention can also be applied to cases where an image capture apparatus other than the DVCR is controlled by a control apparatus via a digital interface. In addition, the present invention can be applied not only to control of switching of the communication modes but also to cases where various operations of an image capture apparatus are controlled by a control apparatus via a digital interface.

The present invention can also be achieved by providing a system or apparatus with a storage or recording medium that stores program code of software (i.e., computer-executable process steps) for realizing the functions of the above-described embodiment, and causing a computer or a CPU (central processing unit), MPU (micro-processing unit) or the like of the system or apparatus to read the program code from the storage medium and then execute the program code.

In this case, the program code itself read from the storage medium realizes the functions of the embodiment. The storage medium storing the program code constitutes the invention. Furthermore, besides the program code read by the computer being executed to realize the functions of the above-described embodiment, the present invention includes an operating system (OS) or the like running on the computer performing an actual process in whole or in part according to instructions of the program code to realize the functions of the above-described embodiment.

Moreover, the present invention also includes a CPU or the like contained in a function expansion board inserted into the computer or in a function expansion unit connected to the computer, the function expansion board or the function expansion unit having a memory in which the program code read from the storage medium is written, the CPU or the like performing an actual process in whole or in part according to instructions of the program code to realize the functions of the above-described embodiment. If the present invention is applied to the above-described storage medium, program code corresponding to the above-described flow chart shown in FIG. 3 is stored in the storage medium.

The above-described embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2003-417002 filed Dec. 15, 2003, which is hereby incorporated by reference herein.

What is claimed is:

1. A control apparatus connected to an image capture apparatus via one of a first interface unit and a second interface unit, wherein the second interface unit is different from the first interface unit, and the image capture apparatus has the first interface unit and the second interface unit, the control apparatus comprising:
  a network interface unit configured to receive a third command which designates a communication mode of the image capture apparatus from a remote control apparatus, the network interface unit being different from both the first interface unit and the second interface unit;
  a command conversion unit configured (a) to convert the received third command into a first command for changing a communication mode of the image capture apparatus to the communication mode designated by the received third command if a communication mode of the image capture apparatus is not the same as the communication mode designated by the received third command and the first interface unit is used for communication between the image capture apparatus and the control apparatus, (b) to convert the received third command into a second command for changing a communication mode of the image capture apparatus to the communication mode designated by the received third command if a communication mode of the image capture apparatus is not the same as the communication mode designated by the received third command and the second interface unit is used for communication between the image capture apparatus and the control apparatus, and (c) not to convert the received third command into either the first command or the second command if a communication mode of the image capture apparatus is the same as the communication mode designated by the received third command; and
  a transmission unit configured (a) to transmit the first command to the image capture apparatus if the received third command is converted into the first command, and (b) to transmit the second command to the image capture apparatus if the received third command is converted into the second command.

2. A control apparatus according to claim 1, wherein the first interface unit is compliant with IEEE 1394.

3. A control apparatus according to claim 1, wherein the second interface unit is compliant with USB (Universal Serial Bus).

4. A control apparatus according to claim 1, wherein each of the first and second commands is a command for changing a communication mode of the image capture apparatus from a camera mode to a VTR mode or a command for changing a communication mode of the image capture apparatus from a VTR mode to a camera mode.

5. A control apparatus according to claim 1, wherein the image capture apparatus includes a digital video camera.

6. A method for controlling a control apparatus connected to an image capture apparatus via one of a first interface unit and a second interface unit, wherein the second interface unit is different from the first interface unit, and the image capture apparatus has the first interface unit and the second interface unit, the method comprising the steps of:
  receiving a third command which designates a communication mode of the image capture apparatus from a remote control apparatus using a network interface unit included in the control apparatus, the network interface unit being different from both the first interface unit and the second interface unit;
  converting the received third command into a first command for changing a communication mode of the image capture apparatus to the communication mode designated by the received third command if a communication mode of the image capture apparatus is not the same as the communication mode designated by the received third command and the first interface unit is used for communication between the image capture apparatus and the control apparatus;
  converting the received third command into a second command for changing a communication mode of the image capture apparatus to the communication mode designated by the received third command if a communication mode of the image capture apparatus is not the same as the communication mode designated by the received third command and the second interface unit is used for communication between the image capture apparatus and the control apparatus;

controlling the control apparatus not to convert the received third command into either the first command or the second command if a communication mode of the image capture apparatus is the same as the communication mode designated by the received third command;

transmitting the first command to the image capture apparatus if the received third command is converted into the first command; and transmitting the second command to the image capture apparatus if the received third command is converted into the second command.

7. A method according to claim 6, wherein the first interface unit is compliant with IEEE 1394.

8. A method according to claim 6, wherein the second interface unit is compliant with USB (Universal Serial Bus).

9. A method according to claim 6, wherein each of the first and second commands is a command for changing a communication mode of the image capture apparatus from a camera mode to a VTR mode or a command for changing a communication mode of the image capture apparatus from a VTR mode to a camera mode.

10. A method according to claim 6, wherein the image capture apparatus includes a digital video camera.

11. A non-transitory computer-readable storage medium for storing computer-executable process steps for controlling a control apparatus connected to an image capture apparatus via one of a first interface unit and a second interface unit, wherein the second interface unit is different from the first interface unit, and the image capture apparatus having has the first interface unit and the second interface unit, the computer-executable process steps comprising:

receiving a third command which designates a communication mode of the image capture apparatus from a remote control apparatus using a network interface unit included in the control apparatus, the network interface unit being different from both the first interface unit and the second interface unit;

converting the received third command into a first command for changing a communication mode of the image capture apparatus to the communication mode designated by the received third command if a communication mode of the image capture apparatus is not the same as the communication mode designated by the received third command and the first interface unit is used for communication between the image capture apparatus and the control apparatus;

converting the received third command into a second command for changing a communication mode of the image capture apparatus to the communication mode designated by the received third command if a communication mode of the image capture apparatus is not the same as the communication mode designated by the received third command and the second interface unit is used for communication between the image capture apparatus and the control apparatus;

controlling the control apparatus not to convert the received third command into either the first command or the second command if a communication mode of the image capture apparatus is the same as the communication mode designated by the received third command;

transmitting the first command to the image capture apparatus if the received third command is converted into the first command; and transmitting the second command to the image capture apparatus if the received third command is converted into the second command.

12. A non-transitory computer-readable storage medium according to claim 11, wherein the first interface unit is compliant with IEEE 1394.

13. A non-transitory computer-readable storage medium according to claim 11, wherein the second interface unit is compliant with USB (Universal Serial Bus).

14. A non-transitory computer-readable storage medium according to claim 11, wherein each of the first and second commands is a command for changing a communication mode of the image capture apparatus from a camera mode to a VTR mode or a command for changing a communication mode of the image capture apparatus from a VTR mode to a camera mode.

15. A non-transitory computer-readable storage medium according to claim 11, wherein the image capture apparatus includes a digital video camera.

16. A control apparatus according to claim 1, wherein if one of the first command and the second command is transmitted to the image capture apparatus and a communication mode of the image capture apparatus is changed to the communication mode designated by the received third command, a connection between the image capture apparatus and the control apparatus is reset.

17. A control apparatus according to claim 1, wherein the remote control apparatus is connected to the control apparatus via Internet.

18. A method according to claim 6, wherein if one of the first command and the second command is transmitted to the image capture apparatus and a communication mode of the image capture apparatus is changed to the communication mode designated by the received third command, a connection between the image capture apparatus and the control apparatus is reset.

19. A method according to claim 6, wherein the remote control apparatus is connected to the control apparatus via Internet.

20. A non-transitory computer-readable storage medium according to claim 11, wherein if one of the first command and the second command is transmitted to the image capture apparatus and a communication mode of the image capture apparatus is changed to the communication mode designated by the received third command, a connection between the image capture apparatus and the control apparatus is reset.

21. A non-transitory computer-readable storage medium according to claim 11, wherein the remote control apparatus is connected to the control apparatus via Internet.

* * * * *